Daniel E. Paris' Improvements in Cooking Stoves.

PATENTED APR. 11 1871

No. 113556

Witnesses.
Merrit E. Paris
Wm. D. Heron

Inventor.
Dan'l E. Paris
Troy, N.Y.

Figure 5:
Figure 6:
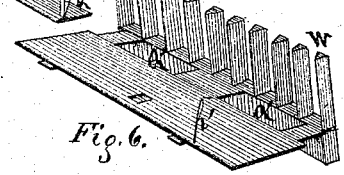
Figure 9:
Figure 8:
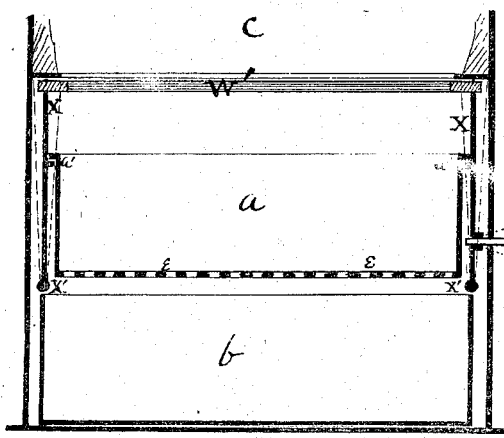
Figure 7:
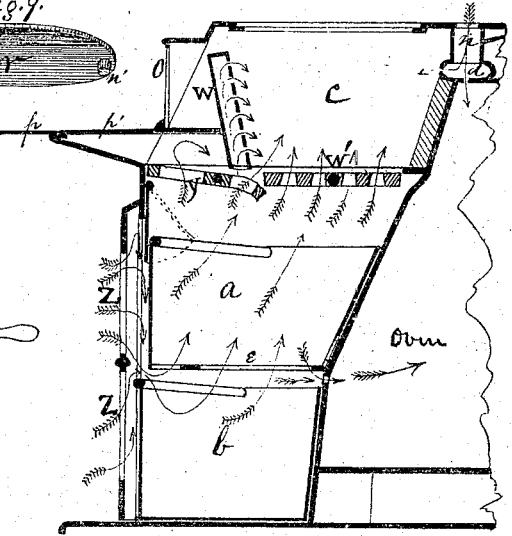

Daniel E. Paris' Improvements in Cooking Stoves.
Sheet 2.
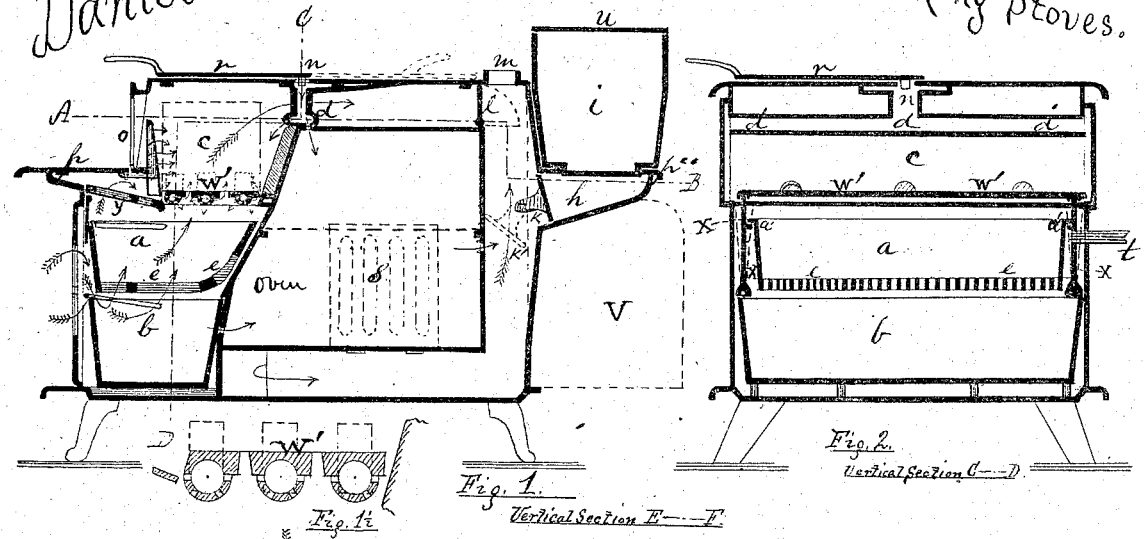
Fig. 1. *Vertical Section E—F.*
Fig. 1½.
Fig. 2. *Vertical Section C—D.*
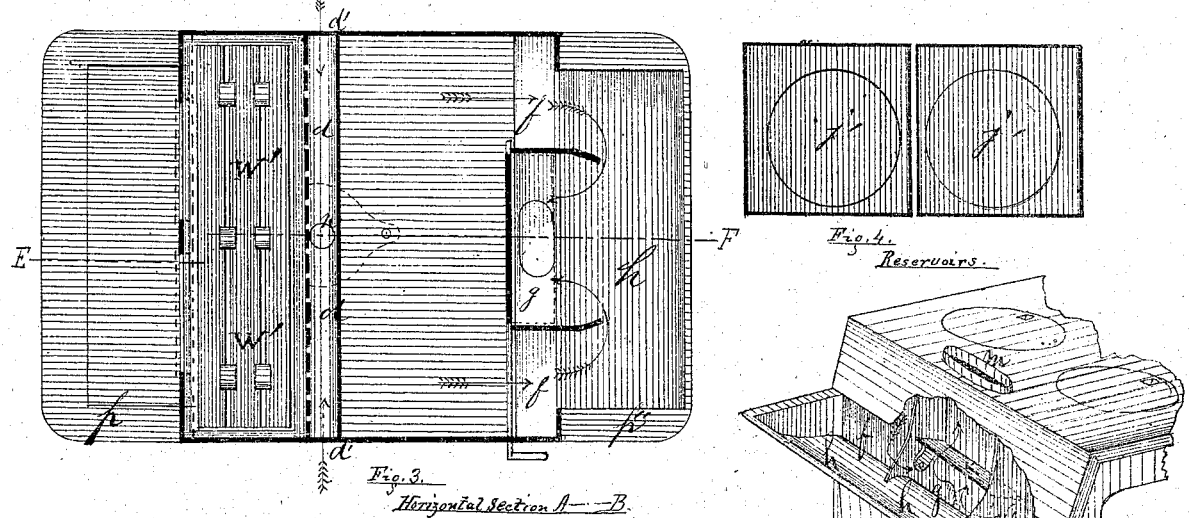
Fig. 3. *Horizontal Section A—B.*
Fig. 4. *Reservoirs.*
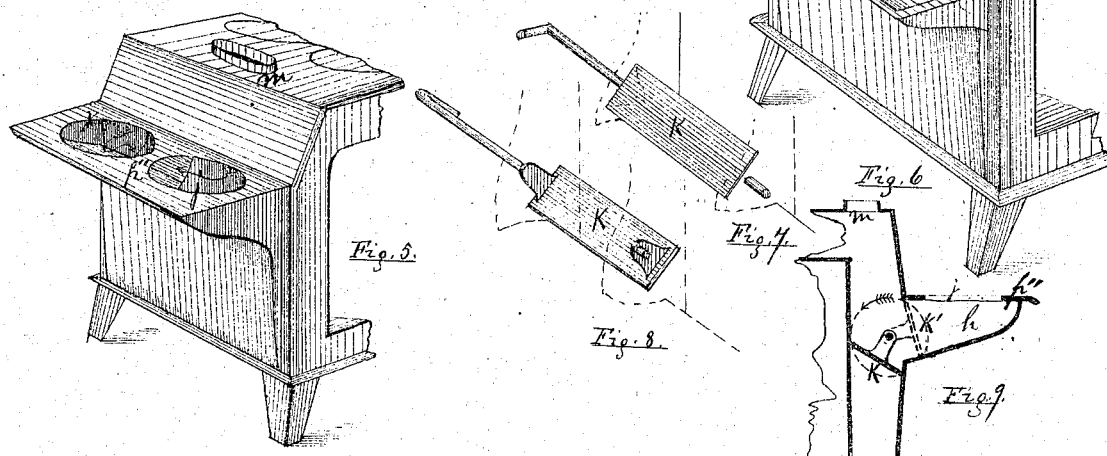
Fig. 5. Fig. 8. Fig. 7. Fig. 6. Fig. 9.
Witnesses.
Merit E. Paris
Wm. D. Heron
Inventor.
Danl. E. Paris
Troy N.Y.

UNITED STATES PATENT OFFICE.

DANIEL E. PARIS, OF TROY, NEW YORK.

IMPROVEMENT IN COOKING-STOVES.

Specification forming part of Letters Patent No. 113,556, dated April 11, 1871.

*To all whom it may concern:*

Be it known that I, DANIEL E. PARIS, of the city of Troy, in the county of Rensselaer and State of New York, have invented new and useful Improvements in Cooking-Stoves; and I do hereby declare that the following is a clear and accurate description of the same, reference being had to the accompanying drawing, and to the letters of reference marked thereon, like letters representing like parts, in which—

Figure 1:
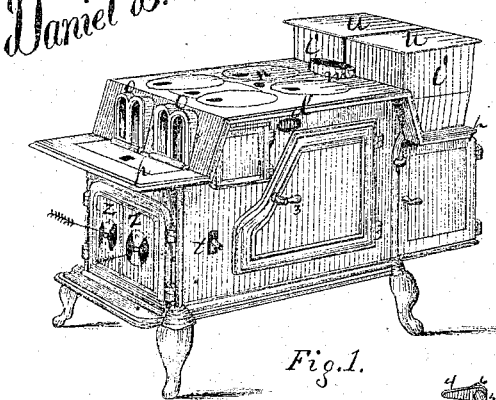
Figure 3:
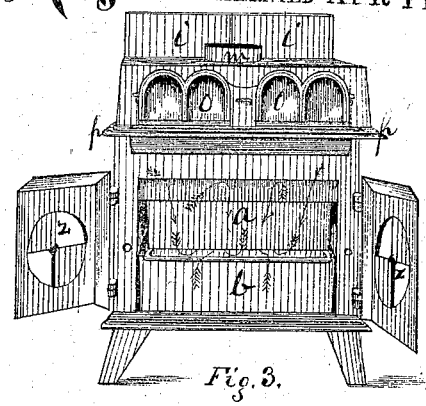
Figure 4:
Figure 2:
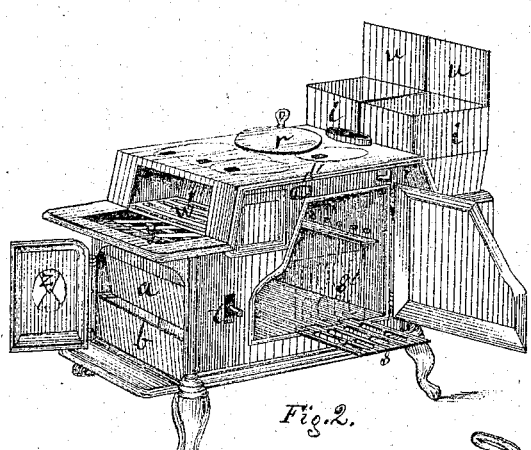

Figure 1 is a perspective outside view of my stove, showing the double reservoir I I and the hot-closet below, and also the mica windows O O, &c. Fig. 2 gives the same general view of the stove, with the oven-door open, the mica windows removed, the reservoir-covers U U turned up, and one of the front ash-box doors open and the other removed from the stove. Fig. 3 is a front view, with the ash-box doors Z Z thrown open, showing the coal-pan A and the ash-pan B, and their positions one above the other. Fig. 4 is a view in perspective of the front fire-plate W. (Seen again at W in Fig. 7.)

This plate is shown attached to the movable hearth-slide $p'$, (seen again at $p$ in Fig. 1,) but it is not necessary to attach it to said plate. Its use is simply to form a front wall to the fire-box, in order to protect the mica from contact with the fuel in the fire-box. The upper part of the plate is made with open bars, so as to allow the light to reflect through the mica windows O O. The lower part of this plate is made close, but it may be made open, if desired, provided a bar or its equivalent is formed across the plate, which shall connect with the hearth or hearth-slide, so as to prevent the air that reaches the fire as draft from passing up over the fire in front of said plate, which, if allowed, would injure the draft; and for this reason the hearth-plate $p$ should come up to the plate W and make close connection with it; or, what is equivalent, the hearth-plate $p$ may come up near to the plate W, and then the opening left may be closed in some other way, such as, for instance, attaching a foot-piece or cap to the mica-door, as seen in Fig. 5 at Q Q.

These pieces Q Q may be one or more, and attached to the mica door or windows O O, so that when the mica door is in its place, as in Fig. 1, the openings $q'$ $q'$ (seen in Fig. 6) will be covered, and thus in effect be the same as though the plate P actually made a close connection with the front fire-plate W.

The object of making this covered opening is that, as coals and ashes accumulate on the hearth P, having passed through the bars or over the plate W, they may be easily disposed of by sweeping or brushing them through the openings $q'$ $q'$, falling into the sifting-pan below.

It will be seen that I locate the hearth above the fire-grate, and about two-thirds of the way down the fire-box from the stove-top to the grate. This location of the hearth is important, as it gives room enough above for perfect illumination, &c., and also room enough below for the large coal-pan A and the large ash-pan B.

Fig. 7 is a sectional side view of the front part of the stove, showing the fire-box C, the coal-pan A, the ash-pan B, the front doors to the ash-chamber and their draft-openings, and also the hearth-plate P and the mica door or doors, which may be stationary or movable, or hung on hinges, so as to open and shut as desired.

It will be seen by the perspective views, Figs. 1 and 5, that this mica door or mica windows consist of or are upright illuminating lights formed on a sloping surface, which surface connects the stove-top with the hearth P. In fact, the hearth P, as well as said sloping part, is merely a continuation of the top plate itself, which, when it reaches the front of the fire-box, is depressed downward to the front at such an obtuse angle as may be desired, and then forward horizontally, forming the hearth-plate P, which latter may be all in one piece, or in two or more pieces, as desired. This sloping surface, together with the upright mica windows, not only gives beauty and gracefulness to the stove-front, but it is useful in gaining the space at $q'$ $q'$ in front of the plate W and in rear of the mica windows; also in giving room to the plate W to lean forward so as to graduate the capacity of the fire-box; and it is essential that the stove-top project as little forward as possible in front of the plate W, because if it projected far forward it would interfere with the feeding the fire with coal over the plate W when the boiler-holes are occupied on top. It would also be more inconvenient to broil over the fire, which is done by a gridiron inserted through the opening formed above the plate W. Thus it is seen that the stove-top should project as little as possible in front of the plate W, and it is also seen that it is very desirable to have plenty of space in rear of the mica door at its base. Thus I call particular attention to the importance of this sloping surface connecting the hearth with the top, and also to the upright windows on this surface, so made that the mica will not blacken because of their greater distance from the fire.

The fire-grate W', Fig. 8, lies loosely on the upright rocker-pieces $x\ x$, which rest on journals at a point some distance below, at $x'\ x'$, and these rocker-pieces are vibrated by the shaker T, inserted into the side of one of them, as seen in Fig. 8, or the grate may be vibrated in the usual way; but this is preferred. The coal-pan A rests upon these same rocker-pieces at a point below the grate, and is made to draw out and push in like a drawer, resting on projecting flanges cast on said rocker-pieces.

Thus it will be seen that the fire-grate and the coal-pan are both moved or vibrated by the shaker T, so that I sift or screen the coals from the ashes at the same time that I shake the grate. The chamber in which these two pans are located forms also a large heating-chamber or hot-air draft, which gives more perfect combustion and is a saving of fuel.

The coal-pan A is made with openings at the bottom to let the ashes through into the ash-pan B, and these openings are not so large as to let the coal through.

The pans A and B are independent of each other, and the fire-grate independent of both, and the grate is made to turn on its journals, so as to dump and clear itself of the coals; and it will be seen that the journals of the rocker-pieces $x\ x$ are so far from the intense heat of the fire-box that they are not affected by it. These rocker-pieces form also conductors or chutes for the ashes to the ash-pan at each end of the same.

The roasting-rack S, Fig. 2, is made so that it will let down horizontally or turn up perpendicularly, and so that when turned up the oven-door may shut over it, and when let down horizontally pans containing articles baking or roasting, especially the dripping-pan, may be drawn out onto it, so that the intense heat of the oven may be avoided, and so that such work as basting meat, for instance, may be done outside of the oven.

The rack is supported by the combination of the side or jamb of the stove with the oven-bottom, which unite at their point of contact to form sockets or slots for one, two, or more projecting arms of said rack. This rack is movable, so that when not in use it can be laid away; and the oven-door may be made to shut over the open sockets or slots formed for its reception. This rack may be attached simply to the sides of the stove or to the oven-bottom only, if so desired.

The oven is ventilated and the fire-box supplied with heated air by means of the openings $d'$ on either side of the stove, Figs. 1 and 2, which admit cool air into the passage $d$, Fig. 7, which latter is connected with the passage N, Fig. 7, the passage N being an opening through the long center or top plate and its lining and support, and the two passages are connected with the oven by small openings down into the oven, and also into the fire-box, as seen by the arrows at $d$ and N in Fig. 7.

The pancake-griddle R, Fig. 9, has a journal cast on the under side at $n'$, which fits into the opening $n$, Fig. 1, and this said griddle may be thrown over any boiler-hole of the stove. As the opening N is equidistant from all four boiler-holes, by this means a cake-griddle may be thrown over any of the boiler-holes, and thus its heat is graduated to any degree desired without lifting it off the stove.

Figure 10:
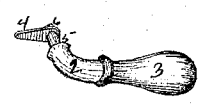

I fasten the doors of the stove, especially the oven-doors, with an improved catch or handle. (Seen in Figs. 1 and 10.) Its novelty consists in the crooked shank 2, combined with the wood attachment 3, the parts 4, 5, and 6 not being new. The object of this crooked shank 2 is to bring the wood handle 3, Fig. 1, down near the surface of the door, so as not to be in the way, and so as to give a greater purchase in tightening the catch.

I have added a second sheet to the drawing, giving more in detail some of the parts, especially the arrangement of flues as regards the reservoirs and the formation of the reservoir seat or chamber.

Fig. 1, Sheet 2, is a vertical section taken through E F of Fig. 3. Fig. 2 is a vertical section taken through C D of Fig. 1. Fig. 3 is a horizontal section taken through A B of Fig. 1. Fig. 4 shows the bottom of the reservoirs and the eccentric position of the flanges or sinks formed on the bottom. Fig. 5 shows the flue-seat and heating-chamber formed on the back of the stove, with the openings $j\ j$ into the same, which are made to correspond with the flanged bottom of the reservoirs or kettles I I. Fig. 6 is the same view as Fig. 5, with the rear plate P removed, showing the movement of heat under the kettles or reservoirs, through the side flues $f\ f$, into the chamber $h\ h$, and thence into the central flue $g$, on its way to the smoke or exit opening at M. Figs. 7, 8, and 9 are different views of the damper K, which damper controls the movement of heat or smoke through the chamber $h\ h$, as follows:

When the damper K, which operates only in the central flue G, as seen in Fig. 6, is turned backward, as in Fig. 1, the heat or products of combustion pass around the oven in the usual way—that is, down the two side flues $f\ f$, and thence to the front of the oven, and thence up the central flue G to the exit-opening M; but when this damper is thrown over to the front, as in Fig. 9, the central flue G is closed, thus compelling the heat to enter the chamber $h\ h$, and thence pass out above the damper K to exit-opening M. In the first instance the heat operates directly upon the oven and indirectly upon the reservoirs, while in the second case it operates directly and powerfully upon the reservoirs, causing them to heat quickly.

These flues may be two instead of three, if desired; but in either case the principle is the same.

The movement of the heat or the products of combustion into the chamber H on its way to the exit-pipe is shown by the arrows in Fig. 3.

It may be observed that no particular position on the stove-back is necessary for the flue-chamber, or therefor for the reservoirs. Nor is it essential that they be in two parts. Thus the chamber H may be near the bottom or near the top of the stove, or part way between, as desired; and the rear plate P may intervene between the chamber H and the bottom of the reservoirs; or it may, and often best, be entirely omitted, as in my application for patent filed January 20, 1869.

The difference between this and the construction there shown consists, first, in the damper K, which here revolves; and, second, in the reservoirs, which are made here movable; and they may be made in one part instead of in two, as was there shown, and the rear plate P removed; and the outer walls of the chamber $h$ may be extended upward, so as to form a connection with the reservoir on its bottom, or part way up its sides, as desired, and the reservoir still be made movable, so as to be taken off and cleaned, or used for other purposes.

It will be observed that the front side of the reservoir comes in parallel contact with the upper part of rear casing of the back flues, so as to receive their radiating heat.

The openings $j\ j$ are shown round; but they may be square or oval or any other desired shape.

Having thus described my invention, I claim—

1. The upright open-barred plate W, in combination with the upright mica door or windows O O, or any equivalent therefor, constructed substantially as herein described and set forth.

2. The rocker-pieces $x\ x$, or any equivalent therefor, when made to support a coal-grate or coal-pan, one or both, for the purpose or substantially in the manner herein shown and described.

3. The coal-pan A and the ash-pan B, the former above the latter, and each independent of the other, in combination with the fire-grate above and the door-openings in front of the same, when made for the purpose or substantially in the manner herein described and set forth.

4. The opening or openings $Q'\ Q'$, formed between the hearth-plate P and the front fire-plate W, in combination with the pieces Q Q, formed on the mica door O O, or any equivalent for the same, when made for the purpose or substantially in the manner herein described and specified.

5. The movable rack S, or its equivalent, made for the purpose, and attached to the stove, substantially in the manner herein shown and described.

6. The mode of ventilating the oven and fire-box by means of the air-passages $d$ and N, when connected and combined with each other substantially in the manner herein set forth and described.

7. The construction of a stove-door knob or catch, made with the crooked shank 2, in combination with the wood attachment 3, when made for the purpose and substantially in the manner herein shown and described.

8. The revolving cake-griddle R, in combination with the central opening N in the stove-top, or its equivalent.

9. The revolving flue-damper K, in combination with the flues $f\ f$ and $g$ and the heating-chamber below the reservoir, made to operate substantially as herein described and shown.

DANL. E. PARIS.

Witnesses:
MERIT E. PARIS,
WM. D. HERON.